(No Model.)  5 Sheets—Sheet 1.

G. B. BERRELL.
SPRING PROPELLED VEHICLE.

No. 329,003.  Patented Oct. 27, 1885.

Attest:
Const. A. Cooper
H. A. Bernhard

George B. Berrell
Inventor
By his Attorneys
Edson Bro's (No Model.) 5 Sheets—Sheet 2.

G. B. BERRELL.
SPRING PROPELLED VEHICLE.

No. 329,003. Patented Oct. 27, 1885.

Attest:
Court A. Cooper
H. T. Burchard

George B. Berrell
Inventor
By his Attorneys
Edson Bro's.

(No Model.) 5 Sheets—Sheet 3.
G. B. BERRELL.
SPRING PROPELLED VEHICLE.
No. 329,003. Patented Oct. 27, 1885.
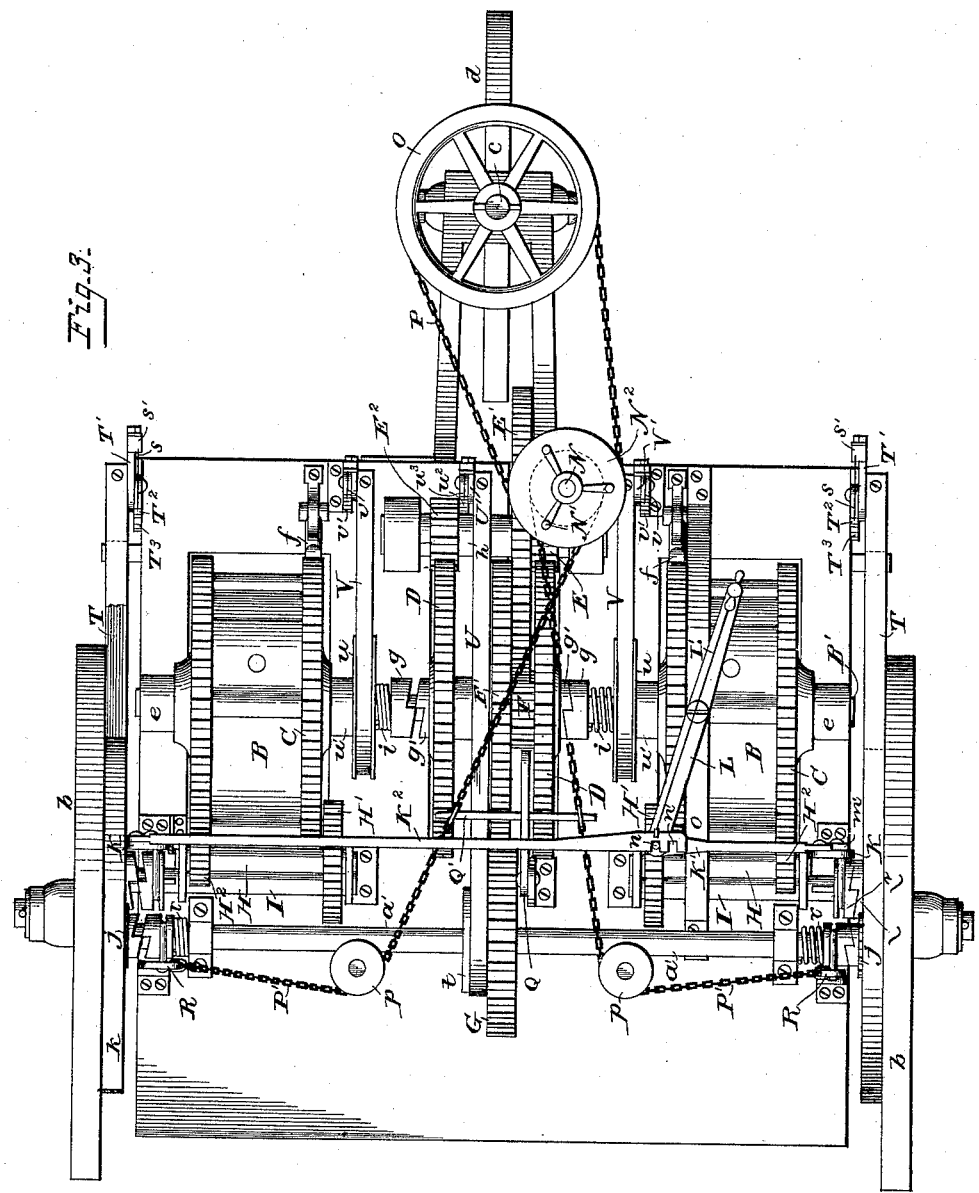

(No Model.)  5 Sheets—Sheet 4.
G. B. BERRELL.
SPRING PROPELLED VEHICLE.
No. 329,003.  Patented Oct. 27, 1885.
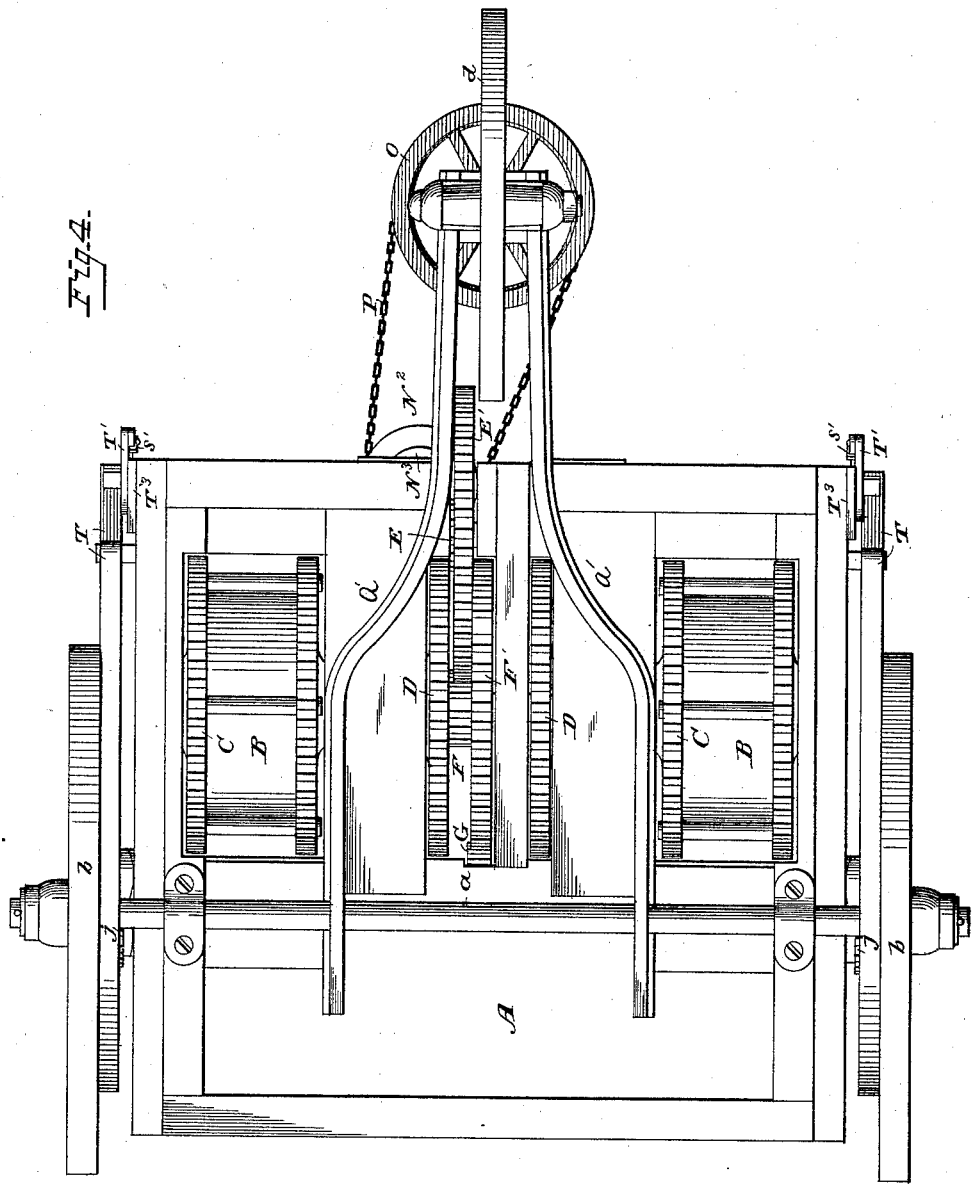

(No Model.) 5 Sheets—Sheet 5.
G. B. BERRELL.
SPRING PROPELLED VEHICLE.
No. 329,003. Patented Oct. 27, 1885.
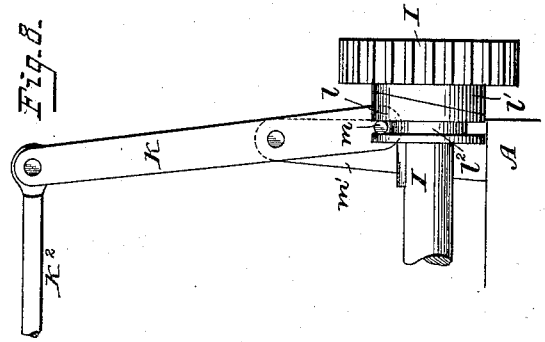
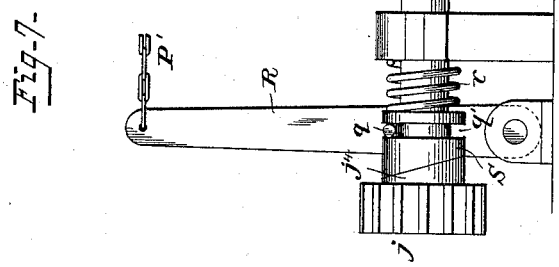
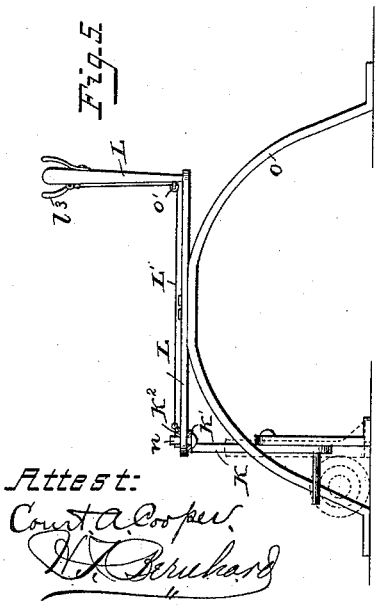
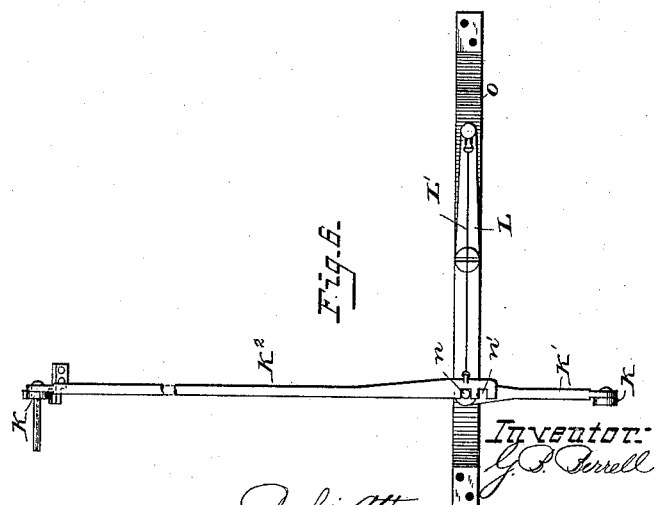
Attest:
Inventor:

UNITED STATES PATENT OFFICE.

GEORGE BARTEN BERRELL, OF WILLOW GROVE, PENNSYLVANIA.

SPRING-PROPELLED VEHICLE.

SPECIFICATION forming part of Letters Patent No. 329,003, dated October 27, 1885.

Application filed December 8, 1884. Serial No. 149,762. (No model.)

*To all whom it may concern:*

Be it known that I, GEORGE B. BERRELL, a citizen of the United States, residing at Willow Grove, in the county of Montgomery and State of Pennsylvania, have invented certain new and useful Improvements in Spring-Motors, of which the following is a specification, reference being had therein to the accompanying drawings.

This invention has relation to improvements in speed motors for vehicles of the tricycle and analogous class, having in particular for its object, among other things, to produce tension or store power while applying or expending power to drive the vehicle; and the invention consists of the sundry combinations of parts, substantially as hereinafter fully set forth, and pointed out in the claims.

Figure 1:
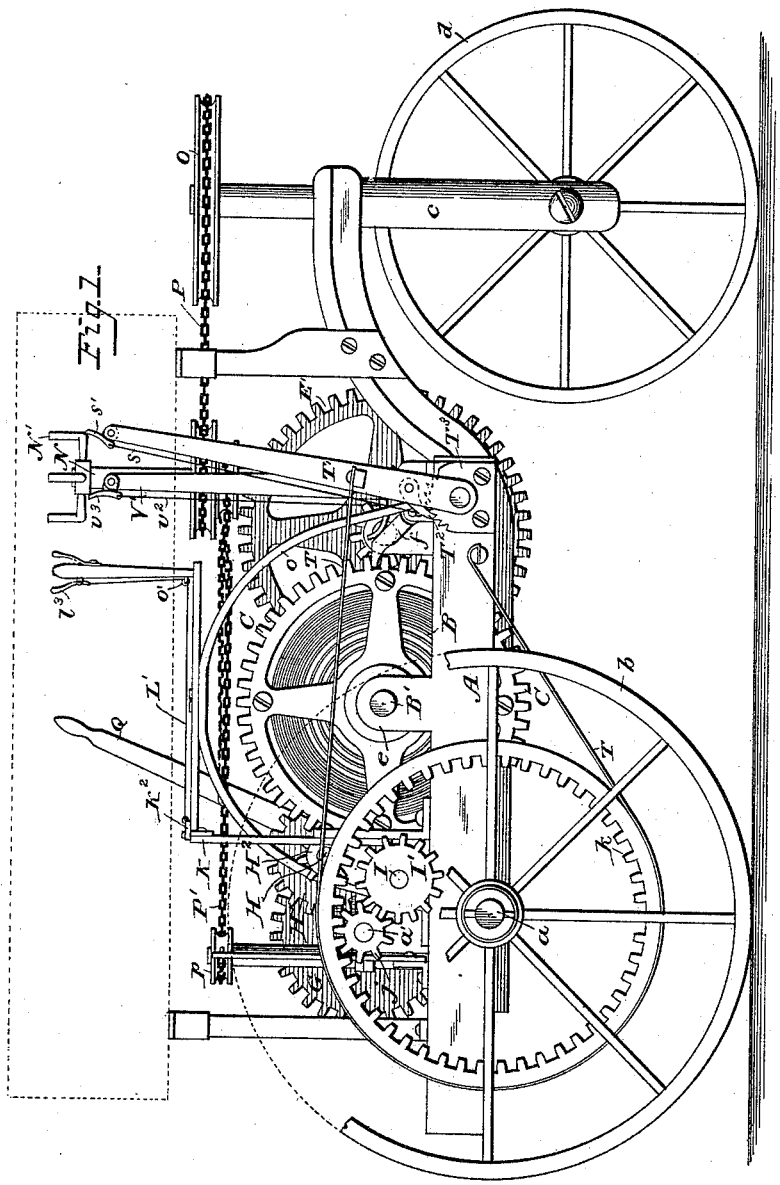
Figure 2:
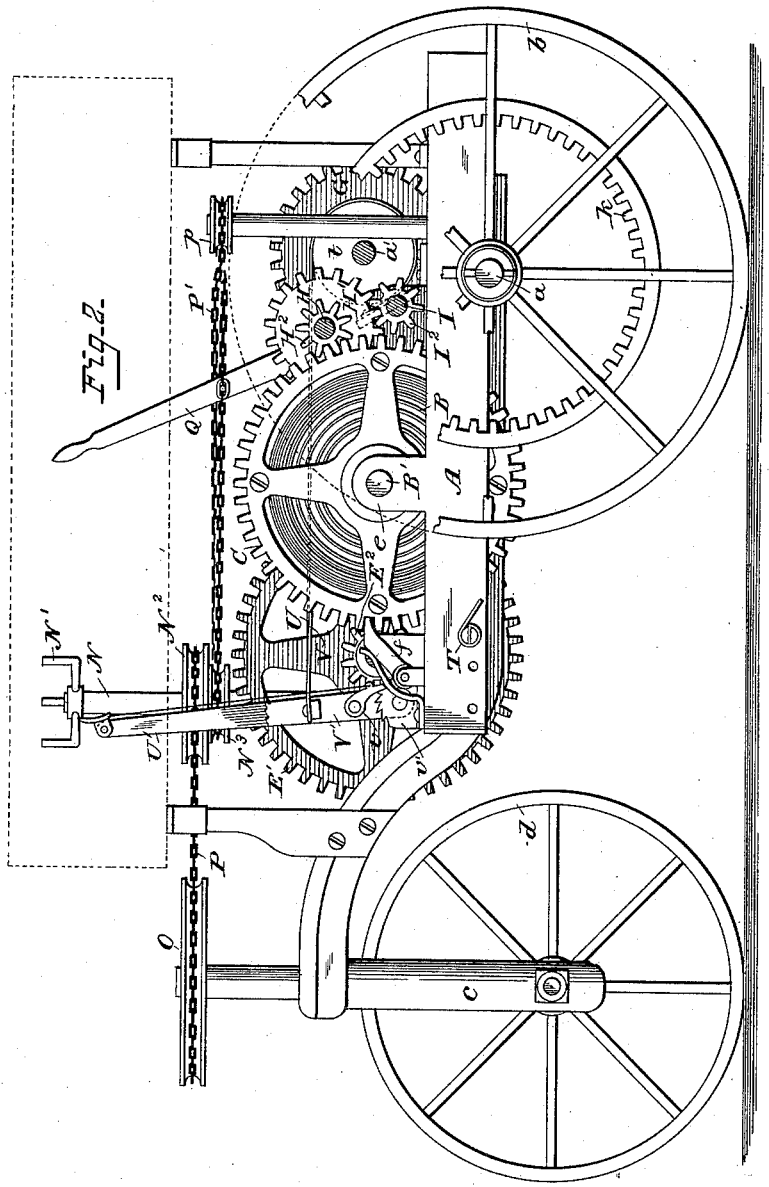

In the accompanying drawings, Figures 1 and 2 are opposite side views, showing in dotted lines the vehicle body in place of my speed-motor, parts being broken away in Fig. 1 and parts being broken away and shown in dotted lines in Fig. 2. Figs. 3 and 4 are a view in plan and an under side view of the same, respectively. Figs. 5 and 6 are an enlarged detailed side view and a plan view, respectively, of the lever of the clutch-shifting contrivance of the spring-rewinding gear. Fig. 7 is an enlarged detail side view of one clutch and its shifting-lever of a propelling-pinion that engages with a driving-wheel rack. Fig. 8 is a similar view of one lever and its pinion of the clutch-shifting contrivance of the spring-rewinding gear.

In the embodiment of my invention I suitably mount a frame or platform, A, upon an axle, *a*, bearing traction-wheels *b*, upon the spindle *c* of a caster or guide wheel, *d*, and upon a "fork," *a'*, connected to said axle upon the under side of the platform and to arms of the spindle of the caster-wheel.

B B are strong broad plate-metal springs, one being disposed upon and at each side of the platform or frame A and coiled around a shaft or axis, B', supported in stout bearings or supports *e*, fastened to side pieces of the platform A, and upon each of which shafts or axes are loosely disposed cogged or toothed wheels C, each pair of which is bolted together at intervals, to one of which bolts is secured the outer end of the spring. With the inner one of each pair of said wheels engages a pawl, *f*, pivoted in ear-plates bolted to the platform A, to hold the same as against reverse action.

Upon each of the shafts B' of the springs B is a sliding annularly-grooved clutch-sleeve, *g*, (see Fig. 3,) being connected to said shaft by the usual spline or feather contrivance, and engaging with a clutch-face, *g'*, of the hub of a large cogged or gear wheel, D, loose upon the shaft B'. A spring, *i*, bears against each sliding clutch-sleeve *g*, its opposite or unresisting end being fastened to said shaft; or, for greater convenience, it may rest against a brake-strap disk or wheel, presently described, the normal action of which spring is to hold said clutch-sleeve into engagement with said hub-clutch faces.

It is obvious that it is desirable that the normal action of said springs *i* should be such as to keep the shafts B' clutched to the wheels D as they do, the propelling power being transmitted therethrough, and that upon reversing the movement of said wheels, as is required in rewinding the springs B, the clutches, by reason of the yielding action of their springs, will readily slip by the engaging clutch-faces of the said wheel-hubs and permit such rewinding of the springs, which will be more fully hereinafter referred to.

The wheel D upon one shaft gears with a pinion, E, with its shaft *h* suitably supported upon the platform. The pinion E is fixed to a gear-wheel or considerably larger pinion, E', than itself, which wheel gears with a small pinion, F, fixed to a much larger pinion or wheel, F', than itself. The wheel F' gears with a pinion, G, upon a shaft, *a'*, suitably supported upon the platform A and carrying pinions *j* at its ends, said pinions *j* being adapted to gear with a toothed rim, as at *k*, secured to the traction-wheels *b*, and through which source the latter receive motion and the machine is propelled. The shifting contrivance for these pinions *j* will be described further on.

Upon the same shaft *h* with the pinion E' is another similar pinion, E², which gears with and transmits the motion of the wheel D of the outer spring-shaft, B', through the aforesaid train of gear-wheels or pinions, to the driving-shaft *a'*.

H H are two other shafts suitably supported upon the platform, contiguously to the wheels C, mounted upon the spring-shafts B', each of which shafts H is provided with two pinions, H' H², one (H') disposed near or at one end of said shaft, and one (H²) gearing with the outer one of each pair of said spring-shaft wheels C.

Below the shafts H are disposed shafts I, also suitably supported upon the platform and carrying pinions I' I² at their ends. The pinions I' are adapted to gear with the propelling-pinions $j$ of the shaft $a'$, while the pinions $j$, as before stated, are caused to gear with the circular racks $k$ of the traction-wheels $b$. The pinions I² gear with the pinions H' of the shafts H, whereby it will be seen that with a shaft H in gear with that wheel C whose spring has exhausted its tension, and with the pinion I' in gear with a pinion $j$ of the shaft $a'$, (the said shaft $a'$ having been previously unclutched from the said pinion $j$, leaving the latter free to turn upon and independently of the said shaft,) said spring will be rewound and put under tension, and for storing power or force for future use, to be applied as hereinafter described.

To effect the engagement of the shafts I with the outer end pinions, I', (the latter being loosely disposed thereon,) said shafts are provided with sliding clutch-sleeves $l$, feathered upon said shafts and engaging clutch-faced hubs of said pinions. The clutch-sleeves $l$ are provided with annular grooves $l^2$, which receive lateral studs or projections at the lower ends of levers K, pivoted upon uprights $m'$, fastened upon or to the platform A, to effect the shifting of said clutch-sleeves $l$ into and out of engagement with the clutch-faced hubs of the pinions I', in order to effect the connection of the shaft I with and disconnection from the pinion I'.

The levers K are connected together to permit of their operation by a common means (presently described) by two rods or bars, K' K². Said rods are pivotally connected at their outer ends to the upper ends of the levers K, while the inner end of one rod or bar section K' is connected to the under side of a right-angled lever, L, at one end of the latter by a pivot-bolt, $n$, and the inner end of the outer bar section, K², is serially notched, as at $n'$, which notches separately engage with or receive the upper projecting squared end of the pivot-bolt $n$ of the rod K, as seen in Figs. 5 and 6. This construction and disposition of parts permit the elongation or contraction of the rod or bar connection K' K² between the levers K, whereby the latter may be so actuated as to cause both of the clutch-sleeves $l$ to synchronously engage with the clutch-faced hubs $l'$ of the pinions I', or both to be likewise retracted or disengaged from said hubs, the former being necessary when it may be desired to rewind at the same time both springs, while the latter is necessary when it may be desired to apply or expend the power of both springs simultaneously in propelling the machine.

The lever L is pivoted about centrally of the length of its horizontal portion upon an arched support, $o$, fastened at its feet to or upon the platform A, as seen in Figs. 5 and 6.

L' is a cord or wire connected at one end to the lever K² at the inner or notched end of the latter, thence passed over a pulley, $o'$, or through an eye affixed in the angle of the lever L, whence said cord or wire is passed and connected to a thumb-piece or supplementary lever, $l^3$, pivoted at the upper end of the vertical arm of the lever L for convenient operation by the hand. It will be seen that while by turning the lever L upon its pivot the actuation of the rod or bar connection K' K² is effected bodily, by actuating the supplementary lever $l^3$, drawing upon the cord or wire L', the bar K² alone can be moved so as to effect the engagement of any one of its notches $n'$ with the bolt $n$ to cause the aforesaid elongation and contraction of said rod or bar connection. A spring is designed to be used and so adapted and disposed with relation to one of the levers K as to move the bar K² automatically outward as said bar is released by the action of the cord or wire L' from the bolt $n$ or the latter is retracted from one of its notches to permit the engagement of its other notch with said bolt.

N is a shaft rotatably planted in the platform A at the front end of the latter, and having a tiller, N', at its upper end, and two chain-pulleys, N² N³, below said tiller.

Around the pulley N² and a larger pulley, O, fixed to the upper end of the spindle $c$ of the steering or caster wheel $d$, is passed an endless-chain belt, P, the action of which will be seen presently.

P' is a second chain passed in contact with the pulley N³ about at its middle, and thence, after crossing itself, passed against two small pulleys, $p$ $p$, whose shafts are suitably supported upon the platform A and disposed in planes in rear of the shaft $a'$. This chain is connected at its ends to the upper ends of levers R, pivoted in studs fastened to the platform A. Said levers are provided with projections $q$, which enter annular grooves $q'$ of clutch-sleeves S, fitted to slide upon the ends of the shaft $a'$. (See Fig. 7.) These clutch-sleeves S are adapted to engage with clutch-faced hubs $j^4$ of the propelling-pinions $j$, before referred to. The clutch-sleeves S are normally held in engagement with the clutch-faced hubs $j^4$ of the pinions $j$ by springs $r$, disposed upon the shaft $a'$ between the shaft-bearings and the said clutch-sleeves, and which springs allow the sleeves to readily slip by said pinion-hubs in backing or reversing the movement of the machine.

By manipulating the tiller or lever N, the action of the chain P and the pulleys N² and O will cause the steering-wheel $d$ to change its plane of travel as is required to effect the turning of the machine or rounding of curves. Simultaneously with such manipulation of the tiller the required pinion $j$ is unclutched from the shaft $a'$ by the action of the chain P', pulleys N³ p, and the levers R, in order to permit the machine to describe the shortest possible curve in its movement. An additional advantage of the unclutching of the pinion j is that the waste of power is avoided, and the rewinding of the springs can be effected in descending declivities or hills.

Q is a lever with its lower end pivoted between a bifurcated stud bolted to the platform A, said lever having a cross rod or bar, Q', secured a little at one side of its middle thereto, and adapted to engage with the links of the chain P', connecting with the steering-chain P, to enable, upon the depression of said lever, the disengagement of both clutches S from the driving-pinions j, when it is desired to simultaneously rewind both springs, as is admissible upon descending a declivity or hill, whereby the power of the springs can be stored.

T T are brake-straps of sheet metal, applied one to each side of the traction-wheels, being passed around or in contact with their circular racks or rings, the lower ends of which straps are fastened to one side of the platform or frame A, near the forward end of said frame, the outer ends of said straps being each connected to a lever, T', pivoted upon a stud or projection of the platform A, near the forward end of the latter, for convenient manipulation by the rider, suitably seated in the body mounted upon the platform. These brake-straps are to retard the action of the traction-wheels in descending hills or declivities. The levers are provided with holding gravity-pawls T², which are held in engagement with toothed posts or racks T³, and to which pawls wires or cords s are connected.

U is another brake-strap, which is applied to the shaft a', through which the action of the springs B is transmitted to the traction-wheels, said brake-strap being passed around or in contact with a frictional pulley, t, fast upon said shaft, one end of which strap is connected to the floor of the platform A, near the pulley t, while the other end thereof is connected to a lever, U', pivoted in like manner as lever T' to the platform A, and being capable of convenient manipulation to vary the expenditure of the force of the springs as may be required to increase or diminish the speed of the vehicle. This lever is also provided with a holding gravity-pawl, u², engaging a rack, u³, fastened to the platform A. The pawls are connected to a supplementary lever, u⁴, pivoted to the upper end of the lever U', to effect the disengagement of the pawls from the racks.

V V are two other similar brake-straps encompassing pulleys u, fast to sleeves u' of the hubs of the inner wheels, C, said straps each having one end connected to the platform A, and the other end connected to a lever, V', pivoted similarly to the other brake-strap levers to the platform A, whereby the unwinding action of the springs is controlled in applying their force or power to the hereinbefore-described train of gearing through which the driving-shaft a' is rotated. The levers V' are also provided with holding gravity-pawls v, engaging toothed posts or racks v', fastened to the platform A, said pawls being connected by wires or cords v² to supplementary levers v³, pivoted to the upper ends of the levers V' for easy operation by the hand to effect the retraction of the said pawls from said racks.

The operation is as follows: I put under tension both springs, the same being wound or coiled by any suitable crank or key applied to the spring-shaft. Presuming that the machine is on a level, it is started and propelled by the application of the force or power of one spring only, the power or force of the other spring being reserved. In coming to the base of a hill or ascent the power or force of the previously-idle spring is also brought into requisition to assist in the propulsion of the machine up the ascent. When the top or eminence has been reached, and upon descending the opposite side or declivity, both of the springs are disconnected from the traction-wheels, as explained hereinbefore, and that spring which has performed the greater service, and whose tension is therefore the nearer exhausted, is put into connection with the rewinding mechanism to be rewound or put under full tension or force, the weight of the machine and its accelerated motion down the declivity or descent being utilized to effect the rewinding of said spring.

Should the distance traveled by the motor or machine in descending such declivity not be sufficient to effect the complete rewinding of the spring, the same may be effected by hand by providing special means therefor, which may consist of a vertical stem or shaft suitably supported from the platform and adapted to gear with the spring-rewinding mechanism, the upper end of said shaft being provided with a crank, lever, or hand-wheel, and being capable of manipulation, when the machine is in motion, by hand. In like manner may the tension of the other previously-helping spring be again rewound.

Modifications in details of construction and form and proportion of parts herein shown as an embodiment of my invention can be made without departing from the principle or sacrificing the advantages thereof; and I would therefore have it understood that I can make such changes and alterations as fairly fall within the scope or spirit of my invention.

Having thus fully described my invention, what I claim as new, and desire to secure by Letters Patent of the United States, is—

1. In a speed-motor for vehicles, the combination, with the traction-wheel driving-shaft, of the power spring or springs, their actuating rings or wheels, whose shaft is geared to said traction-wheel driving-shaft, substantially as and for the purpose described.

2. In a speed-motor for vehicles, the combination, with the traction-wheel driving-shaft, of the power-springs whose rings or wheels are mounted upon independent shafts, and each of which is geared to said traction-wheel driving-shaft to jointly or separately affect said shaft, substantially as and for the purpose set forth.

3. In a speed-motor for vehicles, the combination, with the traction-wheel driving-shaft, of the power-springs actuating toothed or cogged wheels whose shafts are geared jointly to a common pinion-shaft, the pinions of said latter shaft being geared to the traction-wheel driving-shaft, substantially as and for the purpose set forth.

4. In a speed-motor for vehicles, the traction-wheels having the circular racks or toothed rings and the driving-shaft carrying pinions gearing with said wheel-racks, in combination with the propelling or power springs actuating rings or wheels whose shafts are geared to the driving-shaft, substantially as and for the purpose set forth.

5. In a speed-motor for vehicles, the combination, with the traction-wheels, of a propelling or power spring or springs whose shaft carries one or more toothed or cogged wheels or rings and an intermediate shaft geared to a pinion of the driving-shaft, the latter being geared to said traction-wheel, said intermediate shaft being geared to one of the cogged or toothed wheels of the said spring to effect the rewinding of the spring, substantially as described.

6. In a speed-motor for vehicles, the combination, with the traction-wheels having racks, of the driving-shaft carrying pinions gearing with said racks and the power-springs actuating toothed rings or wheels geared through intermediate shafts and pinions to the said pinions of the driving shaft, the shafts of said toothed wheels or rings being geared to the traction-wheel driving-shaft, whereby the power of said springs can be applied, and either one of said springs can be synchronously put under tension or rewound, substantially as described.

7. In a speed-motor, the power or propelling springs whose toothed rings or wheels are mounted upon shafts to apply, through gearing, the propelling power of said springs to the traction-wheel driving-shaft, in combination with a shaft geared to said toothed rings or wheels and to supplementary shafts geared to a pinion of the driving-shaft geared to the traction-wheels, substantially as and for the purpose set forth.

8. In a speed-motor for vehicles, the shaft having a tiller or lever applied to its upper end and carrying a pulley, in combination with the chain passing in contact with said pulley and connected with lever-actuating clutches engaging with the driving-shaft pinions, substantially as and for the purpose described.

9. In a speed-motor for vehicles, the shaft carrying a tiller or lever and pulleys, in combination with the steering-wheel, the lever-actuating clutches engaging with the driving-shaft pinions, and the chains, one connecting said shaft to said clutch-actuating lever, and the other chain connecting said tiller-shaft to said steering-wheel, substantially as and for the purpose set forth.

10. The combination, with the clutches which engage the driving-shaft pinions, the levers actuating said clutches, and the steering-chain, of the lever having a cross rod or bar adapted to engage the steering-chain, substantially as and for the purpose described.

11. In a speed motor for vehicles, the strap-brakes comprising straps of sheet metal and the levers connected to said straps, in combination with the power-spring, applying-shaft, and the traction-wheels, together with holding gravity pawls and racks, substantially as and for the purpose set forth.

12. In a speed-motor, the clutch-actuating levers of the spring-rewinding gear, in combination with the rod or bar connection connected to said levers and to a hand-lever, substantially as and for the purpose described.

13. In a speed-motor, the clutch-actuating levers of the spring-rewinding gear, in combination with the spring rod or bar connection connected to said levers, a rod or bar section of said connection being adjustable, and a hand-lever having means to effect the adjustment of said rod or bar section, substantially as and for the purpose described.

In testimony whereof I affix my signature in presence of two witnesses.

GEORGE BARTEN BERRELL.

Witnesses:
 THOMAS BUCKMAN HARPER,
 JESSE HELLINGS.